US009928605B2

(12) United States Patent
Bleiweiss et al.

(10) Patent No.: US 9,928,605 B2
(45) Date of Patent: Mar. 27, 2018

(54) REAL-TIME CASCADED OBJECT RECOGNITION

(71) Applicant: Intel Corporation, Santa Clara, CA (US)

(72) Inventors: Amit Bleiweiss, Yad Binyamin (IL); Yaron Yanai, Modiin (IL); Yinon Oshrat, Neve Daniel (IL); Amir Rosenberger, Ness Ziona (IL)

(73) Assignee: Intel Corporation, Santa Clara, CA (US)

(*) Notice: Subject to any disclaimer, the term of this patent is extended or adjusted under 35 U.S.C. 154(b) by 32 days.

(21) Appl. No.: 14/866,046

(22) Filed: Sep. 25, 2015

(65) Prior Publication Data

US 2017/0091953 A1   Mar. 30, 2017

(51) Int. Cl.
| | |
|---|---|
| *G06K 9/00* | (2006.01) |
| *G06T 7/20* | (2017.01) |
| *G06T 1/60* | (2006.01) |
| *G06T 7/00* | (2017.01) |
| *H04N 13/02* | (2006.01) |
| *G06K 9/66* | (2006.01) |

(52) U.S. Cl.
CPC ............ *G06T 7/2033* (2013.01); *G06K 9/66* (2013.01); *G06T 1/60* (2013.01); *G06T 7/0081* (2013.01); *G06T 7/0085* (2013.01); *H04N 13/0203* (2013.01)

(58) Field of Classification Search
None
See application file for complete search history.

(56) References Cited

U.S. PATENT DOCUMENTS

| | | | | |
|---|---|---|---|---|
| 7,995,055 | B1* | 8/2011 | Ma ..................... | G06K 9/4604 345/420 |
| 8,867,793 | B2* | 10/2014 | Taylor ............... | G06K 9/00771 382/106 |
| 9,113,002 | B2* | 8/2015 | Zhang ............... | G06F 17/30247 |
| 9,240,049 | B2* | 1/2016 | Ciurea ................... | G06T 7/593 |
| 9,646,201 | B1* | 5/2017 | Horowitz ........... | G06K 9/00389 |
| 2009/0103780 | A1* | 4/2009 | Nishihara ............. | G06F 3/017 382/103 |
| 2009/0185746 | A1* | 7/2009 | Mian .................. | G06K 9/00201 382/209 |

(Continued)

*Primary Examiner* — Nancy Bitar
(74) *Attorney, Agent, or Firm* — Schwegman Lundberg & Woessner, P.A.

(57) ABSTRACT

Various systems and methods for real-time cascaded object recognition are described herein. A system for real-time cascaded object recognition comprises a processor; and a memory, including instructions, which when executed on the processor, cause the processor to perform the operations comprising: accessing image data at the system, the image data of an environment around the system, the image data is captured by a camera system; determining a set of regions in the image data, the set of regions including candidate objects; transmitting a subset of the image data corresponding to the set of regions to a remote server, the remote server to analyze the subset of the image data and detect an object in the subset of the image data; and receiving at the system from the remote server, an indication of the object detected in the subset of the image data.

19 Claims, 7 Drawing Sheets

(56) References Cited

U.S. PATENT DOCUMENTS

| | | | |
|---|---|---|---|
| 2011/0098056 A1* | 4/2011 | Rhoads | G01C 21/20 455/456.1 |
| 2012/0233070 A1* | 9/2012 | Calman | G06Q 20/3276 705/41 |
| 2013/0182908 A1* | 7/2013 | Nishimura | G06K 9/78 382/104 |
| 2013/0336524 A1* | 12/2013 | Zhang | G06K 9/00355 382/103 |
| 2015/0227784 A1* | 8/2015 | Roy | G06K 9/00201 382/103 |

* cited by examiner

REAL-TIME CASCADED OBJECT RECOGNITION

TECHNICAL FIELD

Embodiments described herein generally relate to image processing and in particular, to a system to provide real-time cascaded object recognition.

BACKGROUND

Object recognition is a field of study within the general field of computer vision. Object recognition is the process of finding and identifying objects in images or videos. Typical approaches for object recognition use a trainable classifier. The classifier uses different input methods, such as feature extraction, gradient-based and derivative-based matching, and image segmentation and blob analysis. In general, object recognition is difficult because of the numerous objects and viewing conditions, the large amount of data in an image, object occlusion, and finite computing resources.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a real-time cascaded object recognition. Object recognition is a building block of scene recognition and understanding. Object recognition enables robotics, augmented reality, gaming, and other areas to provide immersive experiences that bridge the physical and digital worlds. A device able to robustly recognize a large number of objects in a scene is able to work intelligently and with minimal human interaction. In the case of robotics, a robot may recognize spaces in a house, navigate efficiently, and interact with specific objects given a simple command. For example, a robot may be directed with the command "Bring Mike's Chicago Bears mug; it's in the kitchen."

Object recognition is a complicated technology using a data-driven solution. One training process is to gather millions of images of real-world objects in their natural environments and train a classifier using machine learning. The trained classifier may then be used to recognize the objects. The complexity, storage, and processing of the classifier grows as the number of objects and the complexity of the environment increase. Both robots and other user devices may benefit from robust object recognition, but these types of devices often have limited memory and computing power. Using a cloud-based classifier eliminates this problem.

The systems and methods described herein support a large set of recognized objects by using cloud resources. This mechanism yields a just-in-time usage module of the classifier, embracing the cloud for hierarchical layers of the classifier depending on the robot or the device's location. This approach enables an infinite number of recognized object, which would be impossible using a purely local approach given the limitations of local hardware. Several mechanisms are implemented to efficiently use cloud resources. While local devices may have less power and resources, a local classifier may be used to pre-process an image and identify regions of the image, which may then be segmented, compressed, and transmitted to cloud resources for further processing. Additional operations are discussed below.

Figure 1:
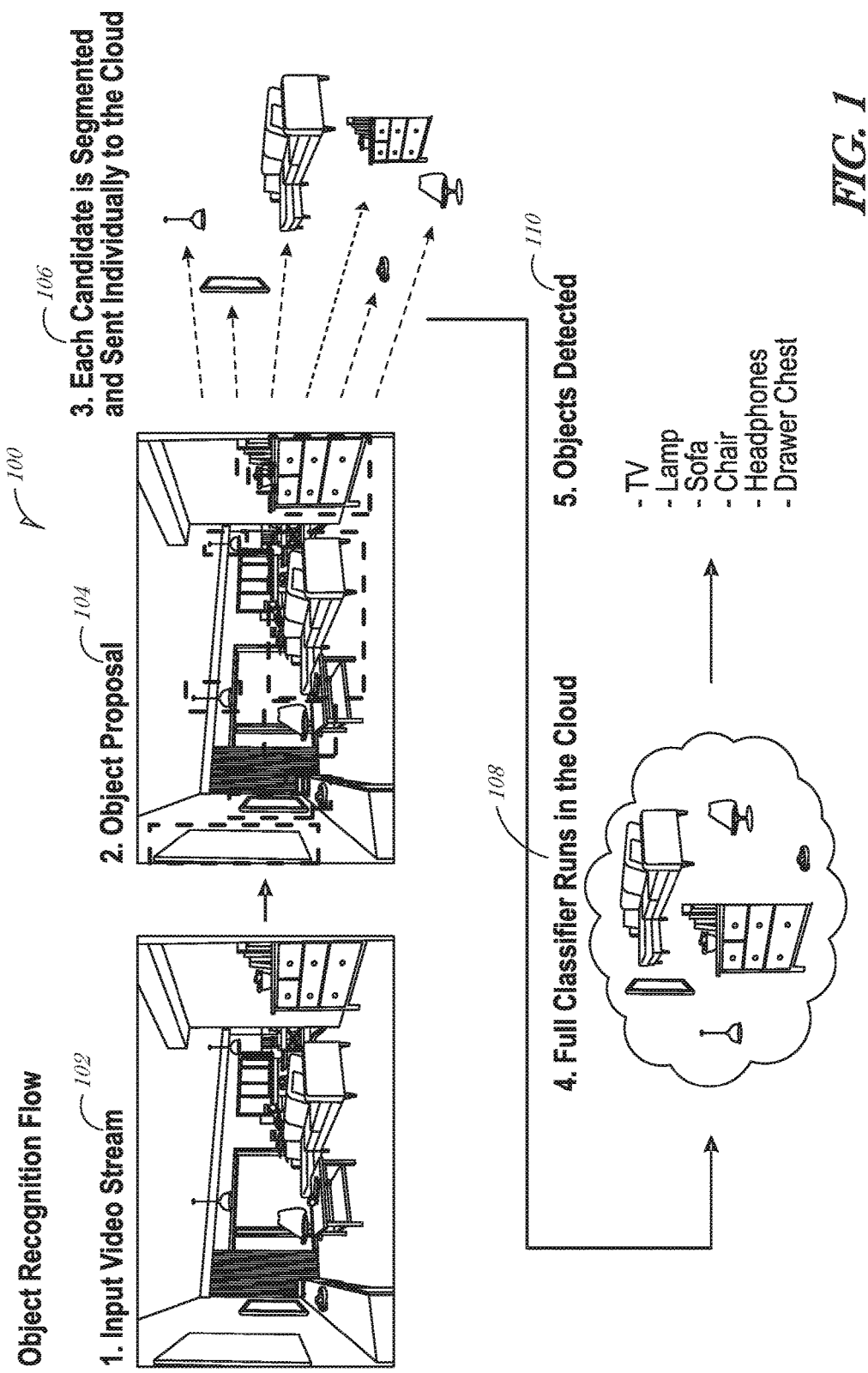
FIG. 1 is a diagram illustrating object recognition flow, according to an embodiment.

FIG. 1 is a diagram illustrating object recognition flow 100, according to an embodiment. An input video stream 102 is received at a client system. The client system may be a user device operated by a user. The user device may be any type of compute device including, but not limited to a mobile phone, a smartphone, a phablet, a tablet, a personal digital assistant, a laptop, a digital camera, a desktop computer, an in-vehicle infotainment system, or the like.

The input video stream 102 includes a scene with multiple objects. In an object proposal stage 104, one or more of the objects are identified as candidates and the portions of the image with the candidate objects are segmented. Some of the candidates may be filtered based on search criteria. A local classifier may be used to filter the objects. Candidates that pass the filter are sent individually to the cloud (stage 106). The candidates may be sent to the same cloud service or different ones. For example, one cloud service may be used to classify furniture while another may be used to classify lights and lamps. Based on the local classification, the appropriate cloud service classifier may be selected and the candidate may be sent to the appropriate cloud service classifier. Full classifiers run in the cloud (stage 108) and the objects that are detected are returned to the client (stage 110).

The process illustrated in FIG. 1 may run continually or periodically so that a user, a robot, a drone, or other camera-enabled device may detect and identify objects as it moves through the room. For example, as the camera moves toward the sofa, additional candidate segments may be obtained and sent to a cloud service to identify. If additional objects, such as a pillow and a remote control are on the sofa, the additional objects may recognized and their identification may be provided to the local device in the room. In this manner, a robot tasked to retrieve a remote control from a sofa may use the ongoing object recognition process to first find the sofa and then after moving to the sofa, finding the remote control on the sofa.

Figure 2:
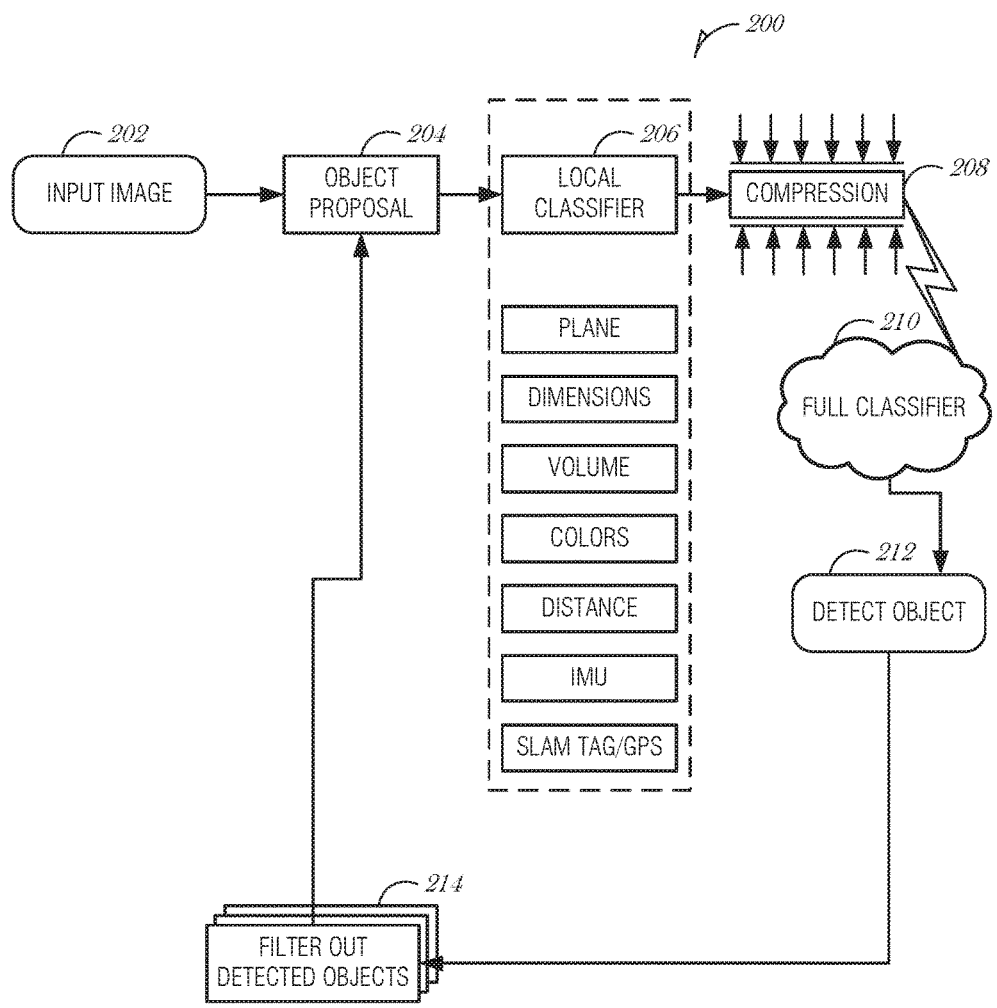
FIG. 2 is a block diagram illustrating control and data flow, according to an embodiment.

FIG. 2 is a block diagram illustrating control and data flow 200, according to an embodiment. At phase 202, an input image is obtained. The input image may be a portion of a video stream (e.g., one frame of a video stream). In addition to image input, the input data may also include inertial management unit (IMU) data. The IMU is a unit in the electronics of a user device, which collects angular velocity and linear acceleration data. The image data and the IMU data may be obtained at the same user device. For example, a user device (e.g., a smartphone) may include a camera system and an accelerometer to capture the image data and the IMU data, respectively.

Using the input image, the object proposal phase 204 filters the data to focus on interesting image regions, which may likely contain objects. Object proposal processing may also filter the regions, for example, when looking for a particular object.

A local classifier 206 is executed on the local machine (e.g., user device). The local classifier 206 is a simple classifier, which is able to run quickly on the local device. The goal of this classifier is to rule out obvious image regions, so that only relevant regions are sent to the cloud for additional processing. The local classifier 206 may filter the image data based on surface characteristics of the objects in the image (e.g., planar or non-planar); dimensions, volume, or colors of objects; distance objects are from the camera; IMU data; or location information (e.g., global positioning system (GPS) coordinates or Simultaneous Localization and Mapping (SLAM) tags). Distance or depth data may be obtained using a depth camera in the camera system of the local machine. A depth camera may include an infrared (IR) camera that is able to pick up a projected IR light, which may be projected from an IR laser projector. While some depth cameras use a single IR camera, the use of multiple IR cameras provides a stereoscopic IR to produce depth.

In an aspect, using planar analysis and filtering, the local classifier 206 may filter objects that are supposed to be planar, but are not, or vice versa. For example, if the object in question is a whiteboard, all non-planar objects may be ignored.

In another aspect, using dimensional analysis and filtering, the local classifier 206 may filter objects that are inconsistent with measurements obtained from depth data. For example, an object that may be initially thought to be a bicycle may be dismissed based on the dimensional data obtained.

In another aspect, using color data, the local classifier 206 may filter objects. For example, when looking for a red sweater, all non-red pixel regions may be ignored.

In another aspect, using depth analysis, the local classifier 206 may filter objects that are not at an expected distance. Depth, size, proportion, and scale are all things that may be measured and analyzed using depth data.

In another aspect, using IMU data, the local classifier 206 may confirm that objects are consistently located in the image based on gravity and accelerometer input. Such data may be used by the local classifier 206 to filter on orientation, for example, to recognize the z-axis and infer height or understand object dimensions regardless of camera orientation.

In another aspect, using GPS or SLAM data, the local classifier 206 may confirm that objects are in their expected environment base on a priori knowledge. For example, a refrigerator will typically be found in a kitchen, so when a robot is located in the bedroom, there may not be any regions of interest.

At stage 208, those regions that are found to include an object are compressed. Any type of image compression may be used, including but not limited to run-length encoding, area image compression, differential pulse-code modulation (DPCM) and predictive coding, entropy encoding, adaptive dictionary algorithms (e.g., Lempel-Ziv-Welch (LZW) as used in GIF and TIFF), deflation (e.g., as used in PNG, MNG, and TIFF), chain codes, reducing color space, chroma subsampling, transform coding, or fractal compression.

The compressed image data is transmitted to one or more cloud services where a full classifier is used for additional processing. At stage 210, the full classifier is applied at a cloud service. The classifier may be a convolutional neural network (CNN or ConvNet), which is a type of feed-forward artificial neural network where the individual neurons are tiled in such a way that they respond to overlapping regions in the visual field. The full classifier may detect a specific object in the selected pixels (image region), detect a specific brand or manufacturer, detect a model number, or the like. The full classifier may work as the camera/robot moves closer to the object of interest. For example, additional features may become visible on an object and sent to the cloud, such as a logo on the object, which may be classified. The additional features (e.g., model, make, brand, etc.) may be returned to the user device.

At stage 212, an object (or objects) is detected and the information is returned to the client user device. The user device may then remove the detected object and the corresponding image region from the pool of regions (stage 214). The user or robot or other camera-based device may then move about the environment to capture additional angles or other perspectives of the objects in the environment. The additional views may be useful for the full classifier (stage 210) to detect and identify the objects in the environment.

Thus, what is described is a system that takes a cascaded approach to object detection, splitting the classifier into a hierarchy based on level of detail and the local device's physical location in the environment. A high-level classifier is available on the device. For example, a robot navigating in a home, the classifier on the robot may recognize specific rooms (e.g., kitchen, living room, etc.). When the robot enters the kitchen, visual data (e.g., image data) is streamed to the cloud where the full classifier resides. The visual data is further analyzed in the cloud using the "kitchen classifier." The kitchen classifier may provide the ability to identify additional details (e.g., utensil drawer, refrigerator, etc.) that the local classifier may not be able to recognize. As the robot nears the utensil drawer a more specific classifier is used to recognize the objects in the drawer. This hierarchical object recognition model enables practically unlimited recognition capabilities, harnessing the power of cloud computing and storage.

In an embodiment, to increase efficiency, the local device compresses the image data before sending it to the cloud. In one aspect, rather than stream the video data all the time, interesting object proposals are segmented using depth data and only that segmented data is streamed to the cloud. This enables real-time streaming of large environments, focusing on relevant data only. Using depth data provides an additional efficiency because a standard RGB camera would not work as well due to the complexity of differentiating between object colors. Instead of depth data, edge detection or other feature detection algorithms may be used for segmentation. However, using depth data for segmentation is advantageous because other segmentation algorithms are more processor intensive, less robust to lighting changes, etc.

Figure 3:
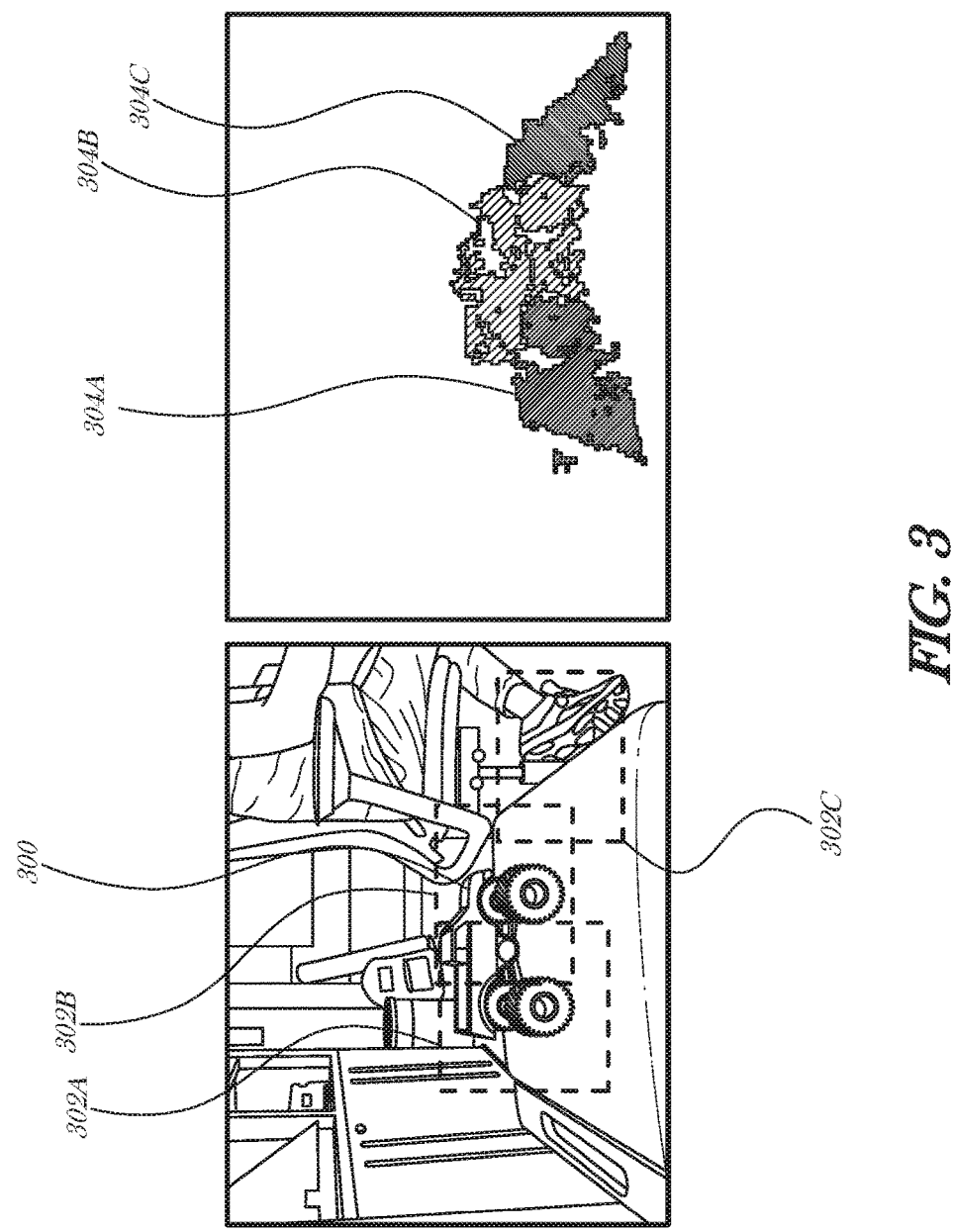
FIG. 3 is an illustration of an object proposal based on depth data.

FIG. 3 is an illustration of an object proposal based on depth data. In FIG. 3, a foreground object 300 is segmented into three regions 302A, 302B, and 302C based on the depth data. Using depth data, certain pixels 304A, 304B, 304C are identified in each of the regions 302. For example, a threshold distance may be used to filter background pixels from foreground pixels, where the foreground pixels include the ones associated with the object 300. Only the pixels 304 that are identified are transmitted to the cloud for additional processing.

Figure 4:
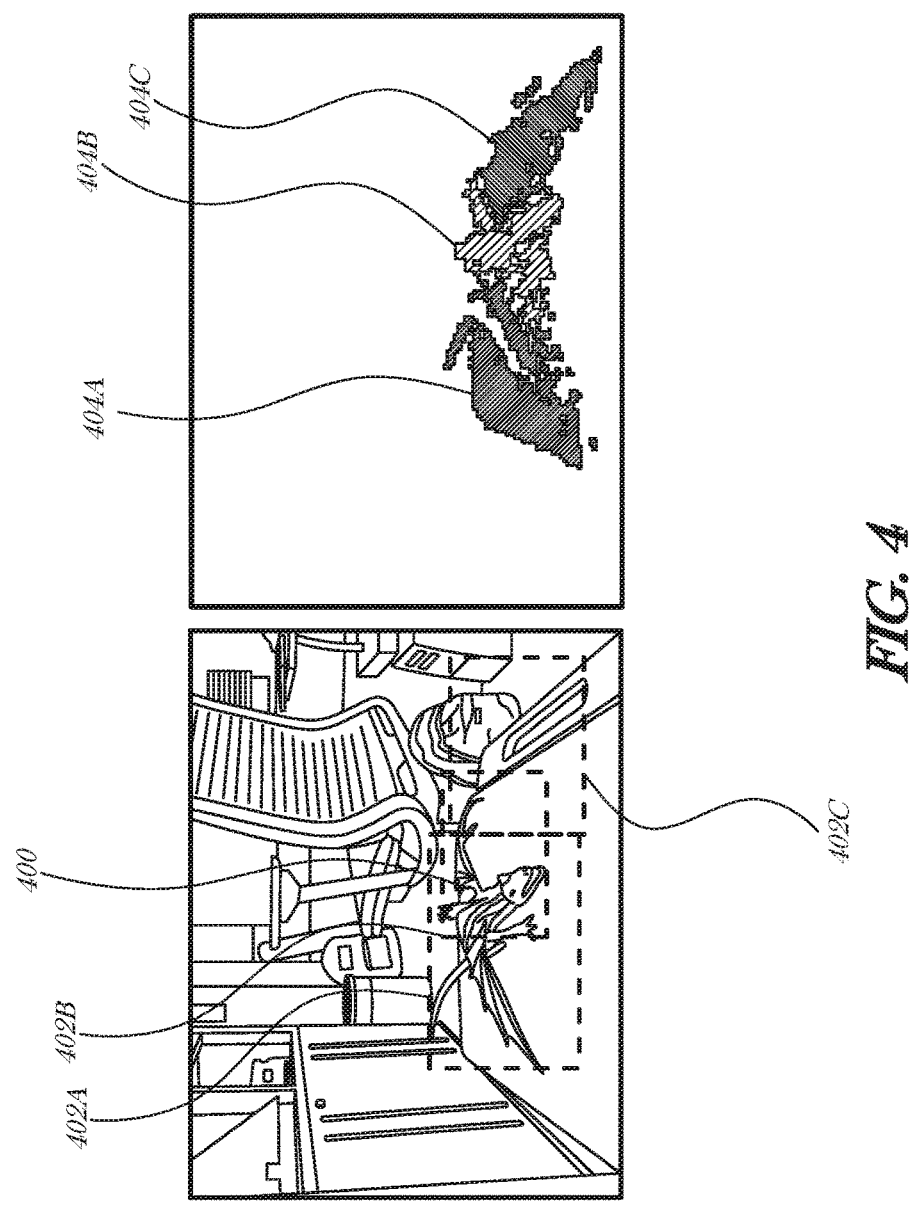
FIG. 4 is an illustration of an object proposal based on depth data.

Similarly, in FIG. 4 another object 400 is segmented to identify three regions 402A, 402B, 402C, and certain pixels 404A, 404B, 404C are identified in each of the regions 402. The pixels 404 are transmitted to the cloud for classification. In both FIGS. 3 and 4, the removal of regions of the complete image, which do not include proposed objects, effectively reduces the amount of data to send. This reductions acts as a form of image compression and may remove large portions of the original image's pixels.

Figure 5:
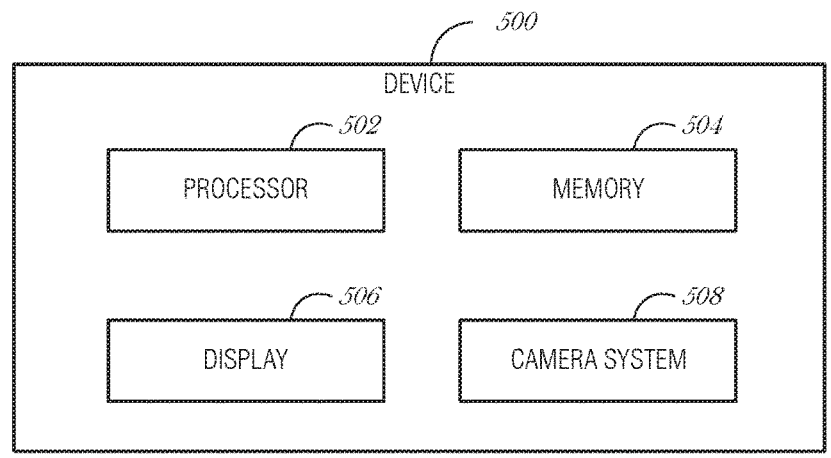
FIG. 5 is a block diagram illustrating a system, according to an embodiment.

FIG. 5 is a block diagram illustrating a system 500, according to an embodiment. The system 500 includes a processor 502, and a memory 504. The memory 504 may include instructions, which when executed on the processor 502, cause the processor 502 to perform operations. The processor 502 may access image data at the system, the image data of an environment around the system, the image data is captured by a camera system 508.

The processor 502 may also determine a set of regions in the image data, the set of regions including candidate objects.

The processor 502 may then transmit a subset of the image data corresponding to the set of regions to a remote server, the remote server to analyze the subset of the image data and detect an object in the subset of the image data. By only transmitting a subset of the image data, the system 500 effectively compresses the amount of data to transmit.

In addition to selective processing of a subset of the image data, the image data that is sent to the remote server may be compressed using an image compression algorithm. In an embodiment, the processor 502 compresses the subset of the image data before transmitting the subset of the image data to the remote server. In various embodiments, compressing the subset of the image data is performed using one of: run-length encoding, area image compression, differential pulse-code modulation (DPCM) and predictive coding, entropy encoding, adaptive dictionary algorithms, deflation, chain codes, reducing color space, chroma subsampling, transform coding, or fractal compression.

In an embodiment, the camera system is incorporated into the system 500. In an embodiment, the camera system comprises a depth camera. The depth camera may use two or more IR cameras to detect an IR signal and determine depth from the cameras to objects in vicinity.

The processor 502 may then receive at the system from the remote server, an indication of the object detected in the subset of the image data.

In an embodiment, the processor 502 determines the set of regions in the image data comprises using an image segmentation process. The processor 502 may use a depth segmentation process. The processor 502 may use an edge detection segmentation process.

In an embodiment, the camera system 508 comprises a depth camera and the subset of image data comprises pixels less than a threshold distance away from the camera system as measured by the depth camera. The threshold may be set dynamically based on the distance a central object is from the camera system.

In an embodiment, the remote server analyzes the subset of the image data using a machine learning process. In a further embodiment, the machine learning process comprises an artificial neural network. In a further embodiment, the artificial neural network comprises a convolutional neural network.

In an embodiment, the indication of the object comprises an instruction. In a further embodiment, the instruction comprises an instruction to the system to maneuver to a different position to capture additional image data to supplement the image data. In an embodiment, the system comprises an autonomous robot.

In an embodiment, the instruction comprises an instruction to a user of the system to maneuver to a different position to capture additional image data to supplement the image data. In a further embodiment, the system comprises a user device.

In an embodiment, the processor 502 displays the indication of the object on a display 506 of the system 500.

Figure 6:
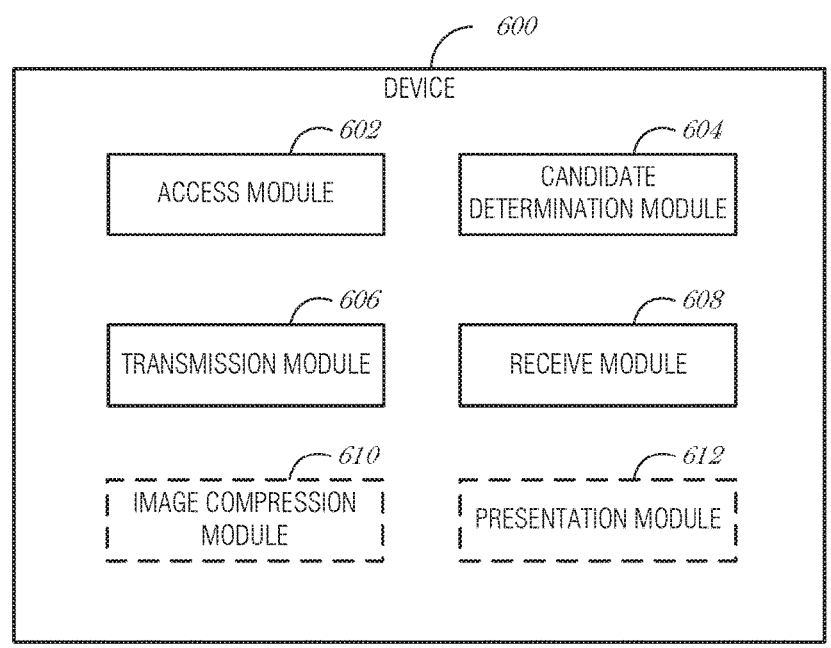
FIG. 6 is a block diagram illustrating a system, according to an embodiment.

FIG. 6 is a block diagram illustrating a system 600, according to an embodiment. The system 600 includes an access module 602 to access image data at the system, the image data of an environment around the system, the image data is captured by a camera system. In an embodiment, the camera system is incorporated into the system 600. For example, the system 600 may be a robot that includes one or more cameras mounted on a pivotable portion to view its surroundings. In an embodiment, the camera system comprises a depth camera. The depth camera may include one or more IR cameras.

In an embodiment, the camera system comprises a depth camera and the subset of image data comprises pixels less than a threshold distance away from the camera system as measured by the depth camera.

The system 600 includes a candidate determination module 604 to determine a set of regions in the image data, the set of regions including candidate objects. In an embodiment, the candidate determination module 604 is configured to determine the set of regions in the image data using an image segmentation process. In a further embodiment, the image segmentation process comprises a depth segmentation process. In another embodiment, the image segmentation process comprises an edge detection segmentation process.

The system 600 also includes a transmission module 606 to transmit a subset of the image data corresponding to the set of regions to a remote server, the remote server to analyze the subset of the image data and detect an object in the subset of the image data.

In an embodiment, the remote server analyzes the subset of the image data using a machine learning process. Various machine learning processes may be used, such as neural networks. Thus, in an embodiment, the machine learning process comprises an artificial neural network. In a further embodiment, the artificial neural network comprises a convolutional neural network.

The system 600 also includes a receive module 608 to receive at the system from the remote server, an indication of the object detected in the subset of the image data.

In an embodiment, the indication of the object comprises an instruction. Feedback from the remote server may include more than just an identification of an object. For example, the feedback may include further instructions, suggestions, or comments. As an example, the remote server may indicate that the object is 65% likely to be of a certain type, but with another position from a certain perspective, the likelihood of the object's correct identification may be increased to 90%. In such an example, the remote server may provide a suggestion or instruction to move to a different position in order to capture a different angle or view of the object in question. Thus, in an embodiment, the instruction comprises an instruction to the system to maneuver to a different position to capture additional image data to supplement the image data. Such an instruction may be delivered to a system that is capable of self-propulsion, such as a robot or a drone. In an embodiment, the system comprises an autonomous robot. Instructions may alternatively be provided to a user, for example, where the system is a tablet computer. Thus, in an embodiment, the instruction comprises an instruction to a user of the system to maneuver to a different position to capture additional image data to supplement the image data. In an embodiment, the system comprises a user device. Various user devices are discussed above.

In an embodiment, the system 600 comprises an image compression module 610 to compress the subset of the image data before transmitting the subset of the image data to the remote server. In a further embodiment, to compress the subset of the image data, the image compression module 610 is to use one of: run-length encoding, area image compression, differential pulse-code modulation (DPCM) and predictive coding, entropy encoding, adaptive dictionary algorithms, deflation, chain codes, reducing color space, chroma subsampling, transform coding, or fractal compression.

In an embodiment, the system 600 includes a presentation module 612 to display the indication of the object on a display of the system. The presentation module 612 may interface with a display on a user device, for example, to present a textual indication of the object.

Figure 7:
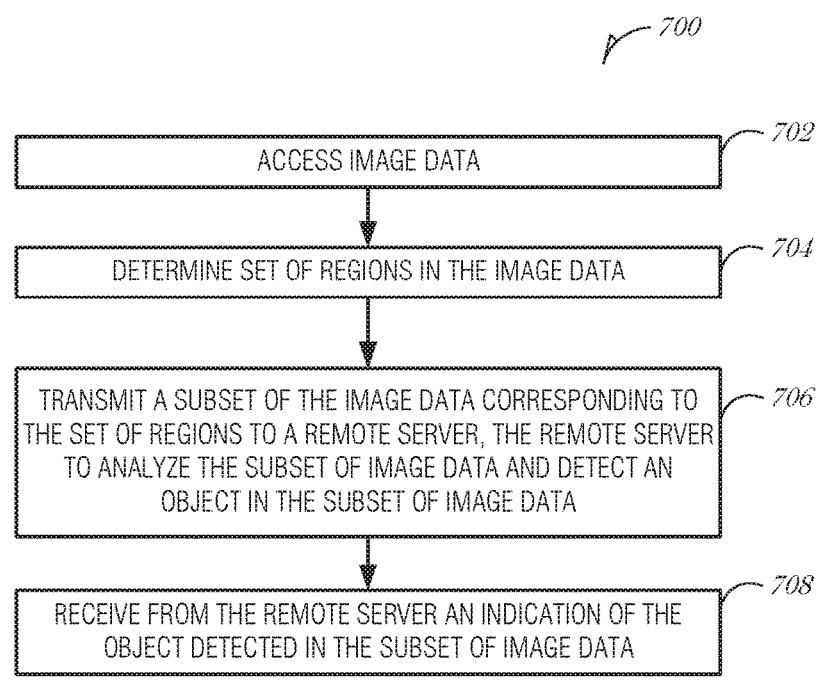
FIG. 7 is a flowchart illustrating a method of real-time cascaded object recognition, according to an embodiment.

FIG. 7 is a flowchart illustrating a method 700 of real-time cascaded object recognition, according to an embodiment. At block 702, image data is accessed at a compute device, the image data of an environment around the compute device, the image data is captured by a camera system. In an embodiment, the camera system is incorporated into the compute device. In an embodiment, the camera system comprises a depth camera.

At block 704, a set of regions is determined in the image data, the set of regions including candidate objects. In an embodiment, determining the set of regions in the image data comprises using an image segmentation process. In a further embodiment, the image segmentation process comprises a depth segmentation process. In another embodiment, the image segmentation process comprises an edge detection segmentation process. Multiple image segmentation processes may be used together.

At block 706, a subset of the image data corresponding to the set of regions is transmitted to a remote server, the remote server to analyze the subset of the image data and detect an object in the subset of the image data. In an embodiment, the camera system comprises a depth camera and the subset of image data comprises pixels less than a threshold distance away from the camera system as measured by the depth camera.

In an embodiment, the remote server analyzes the subset of the image data using a machine learning process. In a further embodiment, the machine learning process comprises an artificial neural network. In a further embodiment, the artificial neural network comprises a convolutional neural network.

At block 708, an indication of the object detected in the subset of the image data is received at the compute device from the remote server. In an embodiment, the indication of the object comprises an instruction. In a further embodiment, the instruction comprises an instruction to the compute device to maneuver to a different position to capture additional image data to supplement the image data. In an embodiment, the instruction comprises an instruction to a user of the compute device to maneuver to a different position to capture additional image data to supplement the image data.

In an embodiment, the method 700 also includes compressing the subset of the image data before transmitting the subset of the image data to the remote server. In a further embodiment, compressing the subset of the image data is performed using one of: run-length encoding, area image compression, differential pulse-code modulation (DPCM) and predictive coding, entropy encoding, adaptive dictionary algorithms, deflation, chain codes, reducing color space, chroma subsampling, transform coding, or fractal compression.

In an embodiment, the method 700 includes displaying the indication of the object on a display of the compute device. For example, the object's identification may be displayed to a user to confirm the correctness of the identification.

Either the local or remote classifier may be trained using user feedback. Thus, in various embodiments, a feedback mechanism is implemented in case of mis-detected objects or false positives. For example, the user may indicate a false detection, upload the relevant images, and re-train the classifier on the cloud.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
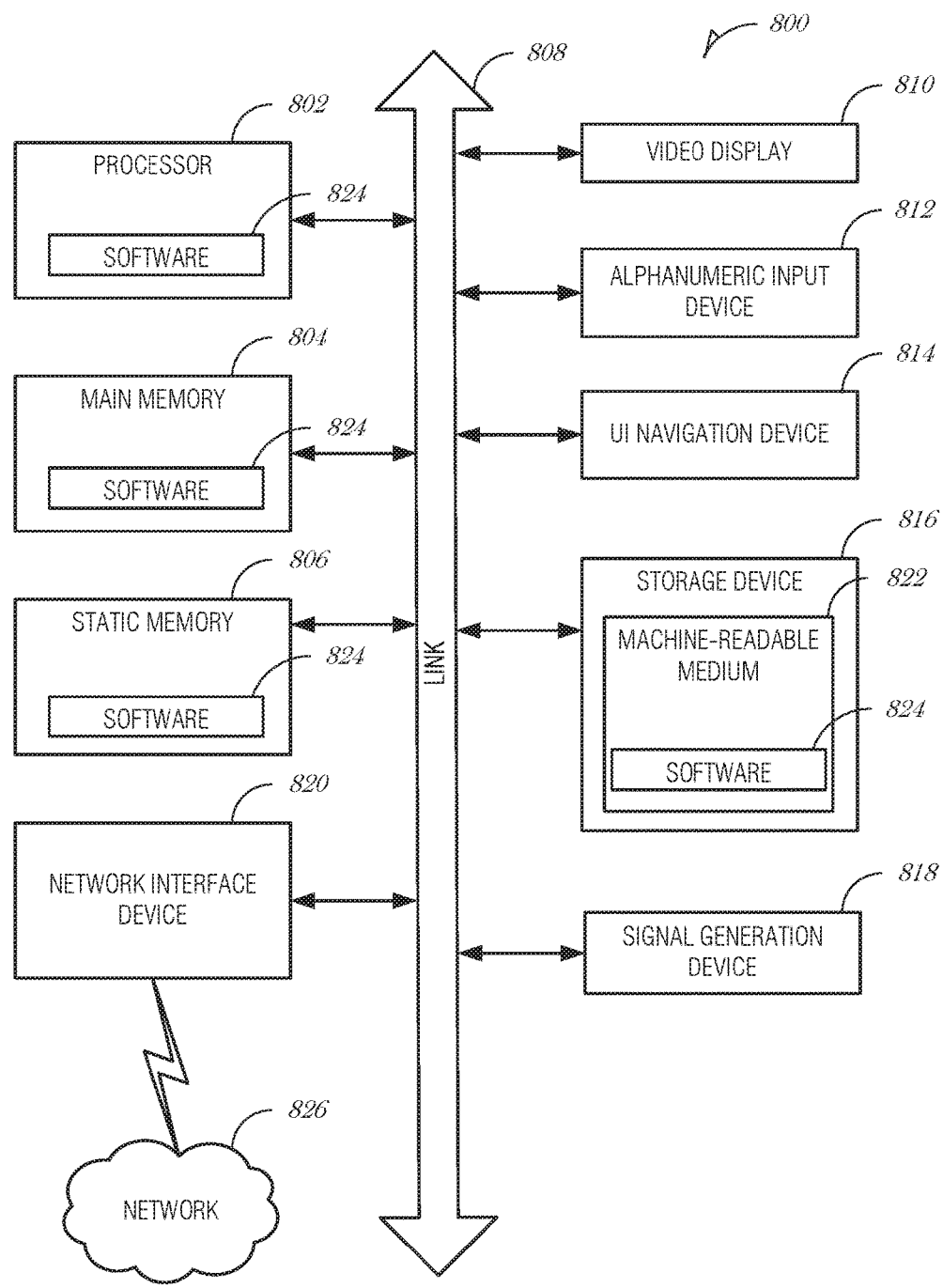
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a robot, drone, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for real-time cascaded object recognition (such as a device, apparatus, or machine) comprising: a processor; and a memory, including instructions, which when executed on the processor, cause the processor to perform the operations comprising: accessing image data at the system, the image data of an environment around the system, the image data is captured by a camera system; determining a set of regions in the image data, the set of regions including candidate objects; transmitting a subset of the image data corresponding to the set of regions to a remote server, the remote server to analyze the subset of the image data and detect an object in the subset of the image data; and receiving at the system from the remote server, an indication of the object detected in the subset of the image data.

In Example 2, the subject matter of Example 1 may include, wherein the processor is to further perform operations compressing the subset of the image data before transmitting the subset of the image data to the remote server.

In Example 3, the subject matter of any one of Examples 1 to 2 may include, wherein compressing the subset of the image data is performed using one of: run-length encoding, area image compression, differential pulse-code modulation (DPCM) and predictive coding, entropy encoding, adaptive dictionary algorithms, deflation, chain codes, reducing color space, chroma subsampling, transform coding, or fractal compression.

In Example 4, the subject matter of any one of Examples 1 to 3 may include, wherein the camera system is incorporated into the system.

In Example 5, the subject matter of any one of Examples 1 to 4 may include, wherein the camera system comprises a depth camera.

In Example 6, the subject matter of any one of Examples 1 to 5 may include, wherein the processor is to further perform operations determining the set of regions in the image data comprises using an image segmentation process.

In Example 7, the subject matter of any one of Examples 1 to 6 may include, wherein the image segmentation process comprises a depth segmentation process.

In Example 8, the subject matter of any one of Examples 1 to 7 may include, wherein the image segmentation process comprises an edge detection segmentation process.

In Example 9, the subject matter of any one of Examples 1 to 8 may include, wherein the camera system comprises a depth camera and the subset of image data comprises pixels less than a threshold distance away from the camera system as measured by the depth camera.

In Example 10, the subject matter of any one of Examples 1 to 9 may include, wherein the remote server analyzes the subset of the image data using a machine learning process.

In Example 11, the subject matter of any one of Examples 1 to 10 may include, wherein the machine learning process comprises an artificial neural network.

In Example 12, the subject matter of any one of Examples 1 to 11 may include, wherein the artificial neural network comprises a convolutional neural network.

In Example 13, the subject matter of any one of Examples 1 to 12 may include, wherein the indication of the object comprises an instruction.

In Example 14, the subject matter of any one of Examples 1 to 13 may include, wherein the instruction comprises an instruction to the system to maneuver to a different position to capture additional image data to supplement the image data.

In Example 15, the subject matter of any one of Examples 1 to 14 may include, wherein the system comprises an autonomous robot.

In Example 16, the subject matter of any one of Examples 1 to 15 may include, wherein the instruction comprises an instruction to a user of the system to maneuver to a different position to capture additional image data to supplement the image data.

In Example 17, the subject matter of any one of Examples 1 to 16 may include, wherein the system comprises a user device.

In Example 18, the subject matter of any one of Examples 1 to 17 may include, displaying the indication of the object on a display of the system.

Example 19 includes subject matter for real-time cascaded object recognition (such as a method, means for performing acts, machine readable medium including instructions that when performed by a machine cause the machine to performs acts, or an apparatus to perform) comprising: accessing image data at a compute device, the image data of an environment around the compute device, the image data is captured by a camera system; determining a set of regions in the image data, the set of regions including candidate objects; transmitting a subset of the image data corresponding to the set of regions to a remote server, the remote server to analyze the subset of the image data and detect an object in the subset of the image data; and receiving at the compute device from the remote server, an indication of the object detected in the subset of the image data.

In Example 20, the subject matter of Example 19 may include, compressing the subset of the image data before transmitting the subset of the image data to the remote server.

In Example 21, the subject matter of any one of Examples 19 to 20 may include, wherein compressing the subset of the image data is performed using one of: run-length encoding, area image compression, differential pulse-code modulation (DPCM) and predictive coding, entropy encoding, adaptive dictionary algorithms, deflation, chain codes, reducing color space, chroma subsampling, transform coding, or fractal compression.

In Example 22, the subject matter of any one of Examples 19 to 21 may include, wherein the camera system is incorporated into the compute device.

In Example 23, the subject matter of any one of Examples 19 to 22 may include, wherein the camera system comprises a depth camera.

In Example 24, the subject matter of any one of Examples 19 to 23 may include, wherein determining the set of regions in the image data comprises using an image segmentation process.

In Example 25, the subject matter of any one of Examples 19 to 24 may include, wherein the image segmentation process comprises a depth segmentation process.

In Example 26, the subject matter of any one of Examples 19 to 25 may include, wherein the image segmentation process comprises an edge detection segmentation process.

In Example 27, the subject matter of any one of Examples 19 to 26 may include, wherein the camera system comprises a depth camera and the subset of image data comprises pixels less than a threshold distance away from the camera system as measured by the depth camera.

In Example 28, the subject matter of any one of Examples 19 to 27 may include, wherein the remote server analyzes the subset of the image data using a machine learning process.

In Example 29, the subject matter of any one of Examples 19 to 28 may include, wherein the machine learning process comprises an artificial neural network.

In Example 30, the subject matter of any one of Examples 19 to 29 may include, wherein the artificial neural network comprises a convolutional neural network.

In Example 31, the subject matter of any one of Examples 19 to 30 may include, wherein the indication of the object comprises an instruction.

In Example 32, the subject matter of any one of Examples 19 to 31 may include, wherein the instruction comprises an instruction to the compute device to maneuver to a different position to capture additional image data to supplement the image data.

In Example 33, the subject matter of any one of Examples 19 to 32 may include, wherein the instruction comprises an instruction to a user of the compute device to maneuver to a different position to capture additional image data to supplement the image data.

In Example 34, the subject matter of any one of Examples 19 to 33 may include, displaying the indication of the object on a display of the compute device.

Example 35 includes at least one machine-readable medium including instructions, which when executed by a machine, cause the machine to perform operations of any of the Examples 19-34.

Example 36 includes an apparatus comprising means for performing any of the Examples 19-34.

Example 37 includes subject matter for real-time cascaded object recognition (such as a device, apparatus, or machine) comprising: means for accessing image data at a compute device, the image data of an environment around the compute device, the image data is captured by a camera system; means for determining a set of regions in the image data, the set of regions including candidate objects; means for transmitting a subset of the image data corresponding to the set of regions to a remote server, the remote server to analyze the subset of the image data and detect an object in the subset of the image data; and means for receiving at the compute device from the remote server, an indication of the object detected in the subset of the image data.

In Example 38, the subject matter of Example 37 may include, means for compressing the subset of the image data before transmitting the subset of the image data to the remote server.

In Example 39, the subject matter of any one of Examples 37 to 38 may include, wherein the means for compressing the subset of the image data is performed using one of: run-length encoding, area image compression, differential pulse-code modulation (DPCM) and predictive coding, entropy encoding, adaptive dictionary algorithms, deflation, chain codes, reducing color space, chroma subsampling, transform coding, or fractal compression.

In Example 40, the subject matter of any one of Examples 37 to 39 may include, wherein the camera system is incorporated into the compute device.

In Example 41, the subject matter of any one of Examples 37 to 40 may include, wherein the camera system comprises a depth camera.

In Example 42, the subject matter of any one of Examples 37 to 41 may include, wherein the means for determining the set of regions in the image data comprise means for using an image segmentation process.

In Example 43, the subject matter of any one of Examples 37 to 42 may include, wherein the image segmentation process comprises a depth segmentation process.

In Example 44, the subject matter of any one of Examples 37 to 43 may include, wherein the image segmentation process comprises an edge detection segmentation process.

In Example 45, the subject matter of any one of Examples 37 to 44 may include, wherein the camera system comprises a depth camera and the subset of image data comprises pixels less than a threshold distance away from the camera system as measured by the depth camera.

In Example 46, the subject matter of any one of Examples 37 to 45 may include, wherein the remote server analyzes the subset of the image data using a machine learning process.

In Example 47, the subject matter of any one of Examples 37 to 46 may include, wherein the machine learning process comprises an artificial neural network.

In Example 48, the subject matter of any one of Examples 37 to 47 may include, wherein the artificial neural network comprises a convolutional neural network.

In Example 49, the subject matter of any one of Examples 37 to 48 may include, wherein the indication of the object comprises an instruction.

In Example 50, the subject matter of any one of Examples 37 to 49 may include, wherein the instruction comprises an instruction to the compute device to maneuver to a different position to capture additional image data to supplement the image data.

In Example 51, the subject matter of any one of Examples 37 to 50 may include, wherein the instruction comprises an instruction to a user of the compute device to maneuver to a different position to capture additional image data to supplement the image data.

In Example 52, the subject matter of any one of Examples 37 to 51 may include, displaying the indication of the object on a display of the compute device.

Example 53 includes subject matter for real-time cascaded object recognition (such as a device, apparatus, or machine) comprising: an access module to access image data at the system, the image data of an environment around the system, the image data is captured by a camera system; a candidate determination module to determine a set of regions in the image data, the set of regions including candidate objects; a transmission module to transmit a subset of the image data corresponding to the set of regions to a remote server, the remote server to analyze the subset of the image data and detect an object in the subset of the image data; and a receive module to receive at the system from the remote server, an indication of the object detected in the subset of the image data.

In Example 54, the subject matter of Example 53 may include, wherein the system comprises an image compression module to compress the subset of the image data before transmitting the subset of the image data to the remote server.

In Example 55, the subject matter of any one of Examples 53 to 54 may include, wherein to compress the subset of the image data, the image compression module is to use one of: run-length encoding, area image compression, differential pulse-code modulation (DPCM) and predictive coding, entropy encoding, adaptive dictionary algorithms, deflation, chain codes, reducing color space, chroma subsampling, transform coding, or fractal compression.

In Example 56, the subject matter of any one of Examples 53 to 55 may include, wherein the camera system is incorporated into the system.

In Example 57, the subject matter of any one of Examples 53 to 56 may include, wherein the camera system comprises a depth camera.

In Example 58, the subject matter of any one of Examples 53 to 57 may include, wherein the candidate determination module to determine the set of regions in the image data using an image segmentation process.

In Example 59, the subject matter of any one of Examples 53 to 58 may include, wherein the image segmentation process comprises a depth segmentation process.

In Example 60, the subject matter of any one of Examples 53 to 59 may include, wherein the image segmentation process comprises an edge detection segmentation process.

In Example 61, the subject matter of any one of Examples 53 to 60 may include, wherein the camera system comprises a depth camera and the subset of image data comprises pixels less than a threshold distance away from the camera system as measured by the depth camera.

In Example 62, the subject matter of any one of Examples 53 to 61 may include, wherein the remote server analyzes the subset of the image data using a machine learning process.

In Example 63, the subject matter of any one of Examples 53 to 62 may include, wherein the machine learning process comprises an artificial neural network.

In Example 64, the subject matter of any one of Examples 53 to 63 may include, wherein the artificial neural network comprises a convolutional neural network.

In Example 65, the subject matter of any one of Examples 53 to 64 may include, wherein the indication of the object comprises an instruction.

In Example 66, the subject matter of any one of Examples 53 to 65 may include, wherein the instruction comprises an instruction to the system to maneuver to a different position to capture additional image data to supplement the image data.

In Example 67, the subject matter of any one of Examples 53 to 66 may include, wherein the system comprises an autonomous robot.

In Example 68, the subject matter of any one of Examples 53 to 67 may include, wherein the instruction comprises an instruction to a user of the system to maneuver to a different position to capture additional image data to supplement the image data.

In Example 69, the subject matter of any one of Examples 53 to 68 may include, wherein the system comprises a user device.

In Example 70, the subject matter of any one of Examples 53 to 69 may include, a presentation module to display the indication of the object on a display of the system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for real-time cascaded object recognition, the system comprising:
   a processor; and
   a memory, including instructions, which when executed on the processor, cause the processor to perform operations comprising:
   accessing image data at the system, the image data of an environment around the system, the image data is captured by a camera system that includes a depth camera;
   determining a set of regions in the image data by using a depth segmentation process that segments the set of regions from other regions in the image data based on depth data obtained by the depth camera, the set of regions including candidate objects;
   transmitting a subset of the image data corresponding to the set of regions to a remote server, the remote server to analyze the subset of the image data and detect an object in the subset of the image data, wherein the subset of the image data comprises pixels less than a threshold distance away from the camera system as measured by the depth camera; and
   receiving at the system from the remote server, an indication of the object detected in the subset of the image data.

2. The system of claim 1, wherein the processor is to further perform operations comprising determining the set of regions in the image data comprises using an image segmentation process.

3. A system for real-time cascaded object recognition, the system comprising:
   an access module to access image data at the system, the image data of an environment around the system, the image data is captured by a camera system that includes a depth camera;
   a candidate determination module to determine a set of regions in the image data by using a depth segmentation process that segments the set of regions from other regions in the image data based on depth data obtained by the depth camera, the set of regions including candidate objects;
   a transmission module to transmit a subset of the image data corresponding to the set of regions to a remote server, the remote server to analyze the subset of the image data and detect an object in the subset of the image data, wherein the subset of the image data comprises pixels less than a threshold distance away from the camera system as measured by the depth camera; and
   a receive module to receive at the system from the remote server, an indication of the object detected in the subset of the image data.

4. The system of claim 3, wherein the system comprises an image compression module to compress the subset of the image data before transmitting the subset of the image data to the remote server.

5. The system of claim 3, wherein the camera system is incorporated into the system.

6. The system of claim 3, wherein the candidate determination module to determine the set of regions in the image data using an image segmentation process.

7. The system of claim 6, wherein the image segmentation process comprises an edge detection segmentation process.

8. At least one non-transitory machine-readable medium including instructions, which when executed by a machine, cause the machine to:
   access image data at a compute device, the image data of an environment around the compute device, the image data is captured by a camera system that includes a depth camera;
   determine a set of regions in the image data by using a depth segmentation process that segments the set of regions from other regions in the image data based on depth data obtained by the depth camera, the set of regions including candidate objects;
   transmit a subset of the image data corresponding to the set of regions to a remote server, the remote server to analyze the subset of the image data and detect an object in the subset of the image data, wherein the subset of the image data comprises pixels less than a threshold distance away from the camera system as measured by the depth camera; and
   receive at the compute device from the remote server, an indication of the object detected in the subset of the image data.

9. The at least one machine-readable medium of claim 8, further comprising instructions to compress the subset of the image data before transmitting the subset of the image data to the remote server.

10. The at least one machine-readable medium of claim 8, wherein the remote server analyzes the subset of the image data using a machine learning process.

11. The at least one machine-readable medium of claim 8, wherein the indication of the object comprises an instruction.

12. The at least one machine-readable medium of claim 11, wherein the instruction comprises an instruction to the compute device to maneuver to a different position to capture additional image data to supplement the image data.

13. The at least one machine-readable medium of claim 8, further comprising instructions to display the indication of the object on a display of the compute device.

14. A method of real-time cascaded object recognition, the method comprising:
   accessing image data at a compute device, the image data of an environment around the compute device, the image data is captured by a camera system that includes a depth camera;
   determining a set of regions in the image data by using a depth segmentation process that segments the set of regions from other regions in the image data based on depth data obtained by the depth camera, the set of regions including candidate objects;
   transmitting a subset of the image data corresponding to the set of regions to a remote server, the remote server to analyze the subset of the image data and detect an object in the subset of the image data, wherein the subset of the image data comprises pixels less than a threshold distance away from the camera system as measured by the depth camera; and
   receiving at the compute device from the remote server, an indication of the object detected in the subset of the image data.

15. The method of claim 14, further comprising compressing the subset of the image data before transmitting the subset of the image data to the remote server.

16. The method of claim 14, wherein the remote server analyzes the subset of the image data using a machine learning process.

17. The method of claim 14, wherein the indication of the object comprises an instruction.

18. The method of claim 17, wherein the instruction comprises an instruction to the compute device to maneuver to a different position to capture additional image data to supplement the image data.

19. The method of claim 14, further comprising displaying the indication of the object on a display of the compute device.

* * * * *